(12) United States Patent
Yamashita et al.

(10) Patent No.: US 8,183,732 B2
(45) Date of Patent: May 22, 2012

(54) RADIAL ANISOTROPIC MAGNET MANUFACTURING METHOD, PERMANENT MAGNET MOTOR USING RADIAL ANISOTROPIC MAGNET, AND IRON CORE-EQUIPPED PERMANENT MAGNET MOTOR

(75) Inventors: Fumitoshi Yamashita, Nara (JP); Hiroshi Murakami, Osaka (JP); Kiyomi Kawamura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/277,355

(22) Filed: Oct. 20, 2011

(65) Prior Publication Data

US 2012/0032537 A1 Feb. 9, 2012

Related U.S. Application Data

(62) Division of application No. 12/281,679, filed as application No. PCT/JP2007/055364 on Mar. 16, 2007, now Pat. No. 8,072,109.

(30) Foreign Application Priority Data

Mar. 16, 2006 (JP) ................................ 2006-072744

(51) Int. Cl.
 *H02K 1/27* (2006.01)
(52) U.S. Cl. .......... 310/156.43; 310/156.38; 310/156.45
(58) Field of Classification Search ............. 310/156.43; 264/427, 434, 435
 See application file for complete search history.

(56) References Cited

U.S. PATENT DOCUMENTS

| 6,650,102 | B2 * | 11/2003 | Hajduk et al. .................. 506/12 |
| 7,828,988 | B2 * | 11/2010 | Yamashita ................. 252/62.54 |
| 7,967,919 | B2 * | 6/2011 | Yamashita ..................... 148/101 |
| 2002/0180294 | A1 * | 12/2002 | Kaneda et al. ........... 310/156.43 |
| 2002/0180295 | A1 * | 12/2002 | Kaneda et al. ........... 310/156.43 |
| 2004/0263303 | A1 * | 12/2004 | Kuriyama et al. ............ 335/306 |

FOREIGN PATENT DOCUMENTS

| EP | 1 480 235 | 11/2004 |
| EP | 1480235 A1 * | 11/2004 |

(Continued)

OTHER PUBLICATIONS

International Search Report issued Jun. 19, 2007 in International (PCT) Application No. PCT/JP2007/055364.

(Continued)

*Primary Examiner* — Quyen Leung
*Assistant Examiner* — Naishadh Desai
(74) *Attorney, Agent, or Firm* — Wenderoth, Lind & Ponack, L.L.P.

(57) ABSTRACT

To improve tranquility and controllability of an iron core-equipped permanent magnet motor with an improved maximum energy product $(BH)_{max}$ by improving shape compatibility of a radial anisotropic magnet, there is provided a radial anisotropic magnet manufacturing method of fixing magnet powder in a net shape so as to maintain a magnetic anisotropic (C-axis) angle of a magnet with respect to a tangential line and for performing a deformation with a flow so as to have a predetermined circular arc shape or a predetermined annular shape. Particularly, by performing a deformation with a viscous flow or an extension flow, a deformability of the magnet is improved, and thus shape compatibility with respect to a thickness is. improved. A C-axis angle θ with respect to a tangential direction is controlled at an arbitrary position and an arbitrary angle so as to reduce cogging torque without separating a magnetic pole into segments.

7 Claims, 6 Drawing Sheets

FOREIGN PATENT DOCUMENTS

| | | |
|---|---|---|
| JP | 46-7153 | 12/1971 |
| JP | 52-054998 | 5/1977 |
| JP | 56-055503 | 5/1981 |
| JP | 59-170201 | 9/1984 |
| JP | 60-128202 | 7/1985 |
| JP | 61-154112 | 7/1986 |
| JP | 62-196057 | 8/1987 |
| JP | 1-234502 | 9/1989 |
| JP | 2-057663 | 2/1990 |
| JP | 3-126801 | 5/1991 |
| JP | 3-62764 | 9/1991 |
| JP | 3-211203 | 9/1991 |
| JP | 4-217024 | 8/1992 |
| JP | 5-213601 | 8/1993 |
| JP | 5-230501 | 9/1993 |
| JP | 5-234729 | 9/1993 |
| JP | 6-17015 | 3/1994 |
| JP | 7-268632 | 10/1995 |
| JP | 7-326508 | 12/1995 |
| JP | 8-143913 | 6/1996 |
| JP | 8-153613 | 6/1996 |
| JP | 8-183601 | 7/1996 |
| JP | 9-157803 | 6/1997 |
| JP | 2003-347142 | 12/2003 |
| JP | 2004-096961 | 3/2004 |
| JP | 2004-140270 | 5/2004 |
| JP | 2004-296873 | 10/2004 |
| JP | 2004296873 A * | 10/2004 |
| JP | 2005-158863 | 6/2005 |
| JP | 2005/158863 | 6/2005 |
| JP | 2005158863 A * | 6/2005 |
| JP | 2006-049554 | 2/2006 |
| JP | 2006049554 A * | 2/2006 |
| WO | 2005/008862 | 1/2005 |

OTHER PUBLICATIONS

Supplementary European Search Report issued Mar. 15, 2010 in EP 07 73 8809, which is a foreign counterpart to the present application.
R. W. Lee et al., "Processing of Neodymium-Iron-Boron Melt-Spun Ribbons to Fully Dense Magnets," IEEE Transactions on Magnetics, vol. 21, No. 5, Sep. 1985, pp. 1958-1963.
G. X. Huang et al., "Application of Melt-Spun Nd-Fe-B Bonded Magnet to the Micro-Motor," Proc. Of the 11th International Rare-Earth Magnets and Their Applications, Pittsburgh, USA, (1990), pp. 583-595.
Y. Iriyama, "Development Trends of High-Performance Rare-Earth Bonded Magnets," Ministry of Education, Culture, Sports, Science and Technology, Innovation Creation Project/Symposium of Efficient Usage of Rare-Earth Resource and Advanced Material, Tokyo, (2002), pp. 19-26 (with partial English Translation).
B. H. Rabin et al., "Recent Developments in Nd-Fe-B Powder," 120th Topical Symposium of the Magnetic Society of Japan, (2001), pp. 23-30.
B. M. MA, "Recent Powder Development at Manequench," Polymer Bonded Magnets 2002, Chicago (Apr. 2002).
S. Hirosawa et al., "Structure and Magnetic Properties of $Nd_2Fe_{14}B$/$Fe_xB$-type Nanocomposites Prepared by Strip Casting," 9th Joint MMM/INTERMAG, CA (2004), FG-05.
H. A. Davies et al., "Nanophase Pr and Nd/Pr Based Rare-Earth-Iron-Boron Alloys," Proc. Of 16th Int. Workshop on Rare-Earth Magnets and Their Applications, Sendai, (2000), pp. 485-494.
T. Mukai et al., "Fully-Dense Nd-Fe-B Magnets Prepared from Hot-rolled Anisotropic Powders," Proc. 11th Int. Workshop on Rare-Earth Magnets and Their Applications, Pittsburgh, (1990), pp. 72-84.
M. Doser et al., "Pulverizing Anisotropic Rapidly Solidified Nd-Fe-B Materials for Bonded Magnets," J. Appl. Phys., vol. 70, (Nov. 1991), p. 6603-6605.
T. Takeshita et al., "Magnetic Properties and Microstructures of the Nd-Fe-B Magnet Powder Produced by Hydrogen Treatment," Proc. 10th Int. Workshop on Rare-Earth Magnets and Their Applications, Kyoto, Japan, (May 1989), pp. 551-562.
K. Morimoto et al., "Anisotropic $Nd_2Fe_{14}B$-Based Magnet Powder with High Remanence Produced by Modified HDDR Process," IEEE Trans. On Magn., vol. 35, (Sep. 1999), pp. 3253-3255.
C. Mishima et al., "Development of a Co-Free NdFeB Anisotropic Bonded Magnet Produced d-HDDR Processed Powder," IEEE. Trans. On Magn., vol. 37, (Jul. 2001), p. 2467-2470.
N. Hamada et al., "Development of Nd-Fe-B Anisotropic Bonded Magnet with 27 MGOe," IEEE. Trans. On Magn., vol. 39, (Sep. 2003), pp. 2953-2955.
Kawamoto et al., "15 MGOe Class SmFeN Compound for Injection Molding Magnets," Magnetic Seminar of Electric Association, (2001), MAG-01-173, pp. 19-23, (includes English Abstract and English drawing labels).
A. Matsuoka et al., "Examination of Performance Improvement [of] Brushless DC Fan Motors," Rotating Equipment Seminar of Electric Association, (2001) RM-01-161, (includes English Abstract).
M. Shimizu et al., "Anisotropic Ring Shape Sintered Nd-Fe-B Magnets," Hitachi Metals Technical Review, vol. 6, (1990), pp. 33-36.
F. Yamashita et al., "Radially Anisotropic Ring/Arc-Shaped Rare-Earth Bonded Magnets Using a Self-Organization Technique," IEEE Trans. On Magnetics, vol. 40, No. 4, (2004), pp. 2059-2064, (includes English Abstract and English drawing labels).
Yoshida et al., "Cogging Torque and Rotor Core Reduction of Segment-Type Surface-Mounted-PM Motor," IEEJ. Trans. IA, vol. 124, (2004), pp. 144-145, (includes English Abstract and English drawing labels).
F. Yamashita et al., "Radially-Anisotropic Rare-Earth Hybrid Magnet with Sel-Organizing Binder Consolidated Under a Heat and a Low-Pressure Configuration," Proc. 18th Int. Workshop on High Performance Magnets and Their Applications, Annecy, France, (2004), pp. 76-83.
English Abstract for "Magnetic Characteristics of rare earth bonded magnets", by Garyo Tokunaga, Fine Particle and Powder metallurgy, vol. 35, pp. 3-7, (1988).

* cited by examiner

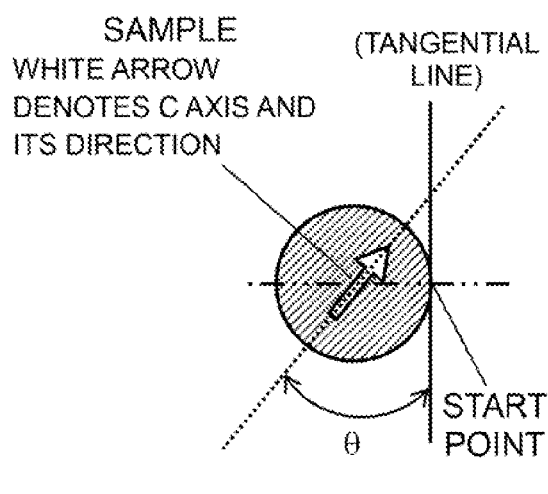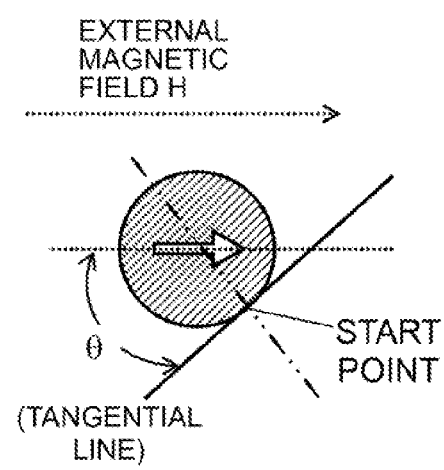
FIG. 7A
FIG. 7B

RADIAL ANISOTROPIC MAGNET MANUFACTURING METHOD, PERMANENT MAGNET MOTOR USING RADIAL ANISOTROPIC MAGNET, AND IRON CORE-EQUIPPED PERMANENT MAGNET MOTOR

This application is a divisional application of Ser. No. 12/281,679 filed Sep. 4, 2008, now U.S. Pat. No. 8,072,109, which is the U.S. National phase of International Application PCT/JP2007/055364, filed Mar. 16, 2007.

TECHNICAL FIELD

The present invention relates to a radial anisotropic magnet manufacturing method including a deformation process. More specifically, the present invention relates to a method of manufacturing a magnet suitable for a decrease in size or an increase in output of a permanent magnet motor, and particularly suitable for a reduction of cogging torque accompanied by a rotation of an iron core-equipped permanent-type motor.

BACKGROUND ART

A type of magnet material such as $Nd_2Fe_{14}B$, $\alpha Fe/Nd_2Fe_{14}B$, and $Fe_3B/Nd_2Fe_{14}B$ obtained by a melt span is limited to a thin band such as a ribbon or flake-shaped powder obtained by milling the same. For this reason, in order to obtain a bulk-shaped permanent magnet which is used in general, a technique is necessary which changes a type of material, that is, fixes the ribbon or the powder to a predetermined bulk in a certain manner. A basic powder fixing means in powder metallurgy is pressureless sintering, but since the ribbon needs to maintain a magnetic characteristic based on a metastable state, it is difficult to apply the pressureless sintering thereto. For this reason, a predetermined-shape bulk fixation is carried out just by using a coupling agent such as epoxy resin. For example, R. W. Lee, etc. have disclosed that a ribbon of $(BH)_{max}$ of 111 $kJ/m^3$ is fixed by resin to thereby obtain an isotropic $Nd_2Fe_{14}B$-based bond magnet of $(BH)_{max}$ of 72 $kJ/m^3$ [R. W. Lee, E. G. Brewer, N. A. Schaffel, "Hot-pressed Neodymium-Iron-Boron magnets" IEEE Trans. Magn., Vol. 21, 1958 (1985)] (see Non-patent Document 1).

In 1986, the present inventors have proved that a small-diameter annular isotropic $Nd_2Fe_{14}B$ bond magnet of $(BH)_{max}$ of ~72 $kJ/m^3$, in which the $Nd_2Fe_{14}B$ magnet powder obtained by milling the melt spun ribbon is fixed by epoxy resin, is suitable for a small-size motor in Japanese Patent Application No. S61-38830. Later, T. Shimoda has compared a characteristic of a small-size motor of the small-diameter annular isotropic $Nd_2Fe_{14}B$-based bond magnet with a characteristic of a small-size motor of Sm—Co-based radial anisotropic bond magnet, and has mentioned that the former is suitable [T. Shimoda, "Compression molding magnet made from rapid-quenched powder", "PERMANENT MAGNETS 1988 UPDATE", Wheeler Associate INC (1988)] (see Non-patent Document 2) . The reports that the former is suitable for a small-size motor have been made by W. Baran ["Case histories of NdFeB in the European community", The European Business and Technical Outlook for NdFeB Magnets, Nov. (1989)], G. X. Huang, W. M. Gao, S. F. Yu ["Application of melt-spun Nd—Fe—B bonded magnet to the micro-motor", Proc. of the 11th International Rare-Earth Magnets and Their Applications, Pittsburgh, USA, pp. 583-595 (1990)] , Kasai ["MQ1, 2&3 magnets applied to motors and actuators", Polymer Bonded Magnets' 92, Embassy Suite O'Hare-Rosemont, Ill., USA, (1992)] , etc., and the former has been widely used as an annular magnet for a permanent magnet motor of a telecommunication equipment, OA, AV, PC, and their peripheral equipments since 1990 (see Non-patent Documents 3, 4, and 5).

On the other hand, a study about magnet material in terms of melt spinning has been actively carried out since 1980. By using a material of which various alloy compositions are controlled in terms of a microstructure, such as nano composite material using an exchange coupling based on a microstructure of $Nd_2Fe_{14}B$-based, $Sm_2Fe_{17}N_3$-based, or $\alpha Fe$, $Fe_3B$-based, etc. with them, isotropic magnet powder having a different powder shape obtained in terms of a rapid solidification method other than a melt spinning can be used for an industrial purpose [for example, YASUHIKO IRIYAMA, "Development Tendency of High-performance Rare-earth Bond Magnet", Ministry of Education, Culture, Sports, Science and Technology, Innovation Creation Project/Symposium of Efficient Usage of Rare-earth Resource and Advanced Material, Tokyo, pp. 19-26 (2002), B. H. Rabin, B. M. Ma, "Recent developments in Nd—Fe—B powder", 120th Topical Symposium of the Magnetic Society of Japan, pp. 23-28 (2001), B M. Ma, "Recent powder development at magnequench", Polymer Bonded Magnets 2002, Chicago (2002) , S. Hirasawa, H. Kanekiyo, T. Miyoshi, K. Murakami, Y. Shigemoto, T. Nishiuchi, "Structure and magnetic properties of $Nd_2Fe_{14}B$/FexB-type nano composite permanent magnets prepared by strip casting", 9th Joint MMM/INTERMAG, Calif. (2004) FG-05] (see Non-patent Documents 6, 7, 8, and 9).

Davies, etc. have reported that isotropic $(BH)_{max}$ is 220 $kJ/m^3$ [H. A. Davies, J. I. Betancourt, C. L. Harland, "Nanophase Pr and Nd/Pr based rare-earth-iron-boron alloys", Proc. of 16th Int. Workshop on Rare-Earth Magnets and Their Applications, Sendai, pp. 485-495(2000)] (see Non-patent Document 10). However, it is supposed that of $(BH)_{max}$ of rapid solidified powder used for an industrial purpose is 134 $kJ/m^3$ and $(BH)_{max}$ of isotropic $Nd_2Fe_{14}B$ bond magnet is almost 80 $kJ/m^3$.

Irrespective of the above description, the permanent magnet motor corresponding to an object of the invention has been continuously demanded to be more decreased in size, to be more increased in output, and to be more tranquil in accordance with an increase in performance of electric and electronic devices. Accordingly, it is obvious that the improvement of the representative magnetic characteristic of $(BH)_{max}$ of the magnet powder of the isotropic bond magnet is useful for an increase in performance of the corresponding motor. Accordingly, in a field of such isotropic bond magnet motor, the necessity of the anisotropic bond magnet motor increases [FUMITOSI YAMASITA, "Application and Anticipation of Rare-earth Magnet to Electronic Device", Ministry of Education, Culture, Sports, Science and Technology, Innovation Creation Project/Symposium of Efficient Usage of Rare-earth Resource and Advanced Material, Tokyo, (2002)] (see Non-patent Document 11).

Incidentally, the Sm—Co-based magnet powder using the anisotropic magnet can obtain a high coercive force HCJ even when an ingot is milled. However, Sm or Co has a large problem of a resource balance, and thus is not widely used as an industrial material. On the contrary, Nd or Fe is advantageous in a view point of a resource balance. However, even when an ingot of $Nd_2Fe_{14}B$-based alloy or a sintered magnet is milled, the HCJ is small.

For this reason, regarding a manufacture of anisotropic $Nd_2Fe_{14}B$ magnet powder, a study that melt spinning material is used as an initial material has been carried out in advance.

In 1989, TOKUNAGA has obtained the anisotropic bond magnet of $(BH)_{max}$ of 127 kJ/m$^3$ in such a manner that a bulk in which $Nd_{14}Fe_{80-x}B_6Ga_x$ (X=0.4 to 0.5) subjected to a hot upsetting (Die-upset) is milled to obtain anisotropic $Nd_2Fe_{14}B$ powder of HCJ=1.52 MA/m and hardened by resin [GARYO TOKUNAGA, "Magnetic Characteristic of Rare-earth Bond Magnet", Fine Particle and Powder metallurgy, Vol. 35, pp. 3-7, (1988)] (see Non-patent Document 12).

In 1991, H. Sakamoto, etc. have manufactured anisotropic $Nd_2Fe_{14}B$ powder of HCJ of 1.30 MA/m by subjecting $Nd_{14}Fe_{79.8}B_{5.2}Cu_1$ to a hot rolling [H. Sakamoto, M. Fujikura and T. Mukai, "Fully-dense Nd—Fe—B magnets prepared from hot-rolled anisotropic powders", Proc. 11$^{th}$ Int. Workshop on Rare-earth Magnets and Their Applications, Pittsburg, pp. 72-84 (1990)] (see Non-patent Document 13).

As described above, there is known powder in which Ga or Cu is added to improve a hot rolling performance and a crystalline diameter of $Nd_2Fe_{14}B$ is controlled to obtain a high HCJ. In 1991, V. Panchanathan, etc. have manufactured anisotropic bond magnet of $(BH)_{max}$ of 150 kJ/m$^3$ in such a manner that hydrogen enters from a grain boundary in terms of a milling method of a hot rolling bulk to thereby break down into $Nd_2Fe_{14}BH_x$ and HD (Hydrogen Decrepitation) —$Nd_2Fe_{14}B$ particle is dehydrogenated in terms of a vacuum heating [M. Doser, V. Panchanacthan, and R. K. Mishra, "Pulverizing anisotropic rapidly solidified Nd—Fe—B materials for bonded magnets", J. Appl. Phys., Vol. 70, pp. 6603-6805 (1991)] (see Non-patent Document 14).

In 2001, Iriyama has improved anisotropic bond magnet of $(BH)_{max}$ of 177 kJ/m$^3$ in such a manner that $Nd_{0.137}Fe_{0.735}Co_{0.067}B_{0.055}Ga_{0.006}$ is Fformed into a particle of 310 kJ/m$^3$ in the same way [T. Iriyama, "Anisotropic bonded NdFeB magnets made from hot-upset powders", Polymer Bonded Magnet 2002, Chicago (2002)] (see Non-patent Document 15).

Meanwhile, Takeshita, etc. have suggested an HDDR method in which Hydrogenation (Hydrogenation, $Nd_2$[Fe, Co]$_{14}$ BHx) of $Nd_2$ (Fe, Co) $_{14}B$ phase occurs and, Decomposition (Decomposition, $NdH_2$+Fe+$Fe_2$B), Desorpsion (Desorpsion), and Recombination (Recombination) occur at 650 to 1,000° C. [T. Takeshita, and R. Nakayama, "Magnetic properties and midro-structure of the Nd—Fe—B magnet powders produced by hydrogen treatment", Proc. 10$^{th}$ Int. Workshop on Rare-earth Magnets and Their Applications, Kyoto, pp. 551-562 (1989)], and in 1999, have manufactured anisotropic bond magnet of $(BH)_{max}$ of 193 kJ/m$^3$ from HDDR—$Nd_2Fe_{14}B$ particle [K. Morimoto, R. Nakayama, K. Mori, K. Igarashi, Y. Ishii, M. Itakura, N. Kuwano, K. Oki, "$Nd_2Fe_{14}B$-based magnetic powder with high remanence produced by modified HDDR process", IEEE. Trans. Magn., Vol. 35, pp. 3253-3255(1999)] (see Non-patent Documents 16 and 17).

In 2001, Mishima, etc. have reported d-HDDR $Nd_2Fe_{14}B$ particle of Co-free [C. Mishima, N. Hamada, H. Mitarai, and Y. Honkura, "Development of a Co-free NdFeB anisotropic magnet produced d-HDDR processes powder", IEEE. Trans. Magn., Vol. 37, pp. 2467-2470 (2001)], and N. Hamada, etc. have manufactured a cubic anisotropic bond magnet (7 mm×7 mm×7 mm) of $(BH)_{max}$ of 213 kJ/m$^3$ and a density of 6.51 Mg/m$^3$ in such a manner that the d-HDDR anisotropic $Nd_2Fe_{14}B$ particle is compressed by 0.9 GPa at 150° C. in the presence of an oriented magnetic field of 2.5 T [N. Hamada, C. Mishima, H. Mitarai and Y. Honkura, "Development of anisotropic bonded magnet with 27 MGOe", IEEE. Trans. Magn., Vol. 39, pp. 2953-2956 (2003)] (see Non-patent Documents 18 and 19) . However, the cubic magnet is not suitable for a general permanent magnet motor.

Meanwhile, in 2001, there is reported an injection forming bond magnet of $(BH)_{,max}$ of ~119 kJ/m$^3$ using RD (Reduction & Diffusion) —$Sm_2Fe_{17}N_3$ fine powder [JUN KAWAMOTO, KAYO SIRAISI, KAZUTOSI ISIZAKA, SINNICHI YASUDA, "15 MGOe-grade SmFeN Injection Forming Compound", Magnetics Seminar of Electric Association, (2001) MAG-01-173] (see Non-patent Document 20). In 2002, Ohmori has reported an anisotropic magnet manufactured by an injection forming of $(BH)_{max}$ of 136 kJ/m$^3$ using weather-resistant RD-$Sm_2Fe_{17}N_3$ fine powder of $(BH)_{max}$ of 323 kJ/m$^3$ [K. Ohmori, "New era of anisotropic bonded SmFeN magnets", Polymer Bonded Magnet 2002, Chicago (2002)] (see Non-patent Document 21) . There is reported that an increase in output of a ferrite sintered magnet is realized by using a surface magnet (SPM) rotor applied with an anisotropic $Sm_2Fe_{17}N_3$ bond magnet of $(BH)_{max}$ of 80 kJ/m$^3$ in terms of such an injection forming radial anisotropic [ATSUSI MATSUOKA, TOUGO YAMAZAKI, HITOSI KAWAGUCHI, "Investigation of Increase in Performance of Blowing Brushless DC Motor", Rotating Equipment Seminar of Electric Association, (2001) RM-01-161] (see Non-Patent Document 22).

However, in the radial oriented magnetic field, when a forming ring cavity decreases in diameter (or increases in length), since most of a magnetomotive force is consumed as a leakage magnetic flux, the oriented magnetic field reduces. Accordingly, $(BH)_{max}$ reduces in a radial direction in accordance with a reduction of an orientation degree and in accordance with a decrease in diameter (an increase in length) irrespective of a bond magnet or a sintered magnet [for example, MOTOHARU SIMIZU, NOBUYUKI HIRAI, "Nd—Fe—B-based sinter-type anisotropic ring magnet", Hitachi Metals Technical Review, Vol. 6, pp. 33-36 (1990)] (see Non-patent Document 23). Since it is difficult to generate a homogeneous radial magnetic field, a problem arises in that productivity is lower than that of the isotropic bond magnet.

However, when the magnetic characteristic in a radial direction is not dependent on a shape, a homogenous orientation is possible, and high productivity can be realized, is possible to expect a distribution of a high $(BH)_{max}$ radial anisotropic magnet suitable for an increase in performance of the permanent magnet motor.

Therefore, the present inventors have disclosed a magnet manufacturing technique and its magnetic characteristic in which a compound of a coupling agent and magnet powder is compressed, and a cross-linking macromolecule of the coupling agent formed after a self-organization is mechanically stretched so that an anisotropic direction is changed to a radial direction in terms of a sintering deformation of the stretched perpendicular anisotropic thin-film magnet [F. Yamashita, S. Tsutsumi, H. Fukunaga, "Radially Anisotropic Ring-or Arc-Shaped Rare-Earth Bonded Magnets Using Self-Organization Techniqu", IEEETrans. Magn., Vol. 40, No. 4 pp. 2059-2064 (2004)] (see Non-patent Document 24). Accordingly, it is possible to manufacture a radial anisotropic magnet having a thickness of 1 mm or so of which a magnetic characteristic hardly reduces even when realizing a decrease in diameter (or an increase in length).

Meanwhile, in an iron core of an iron core-equipped permanent magnet motor, there are a slot for mounting excitation winding wires and teeth for forming a part of a magnetic circuit together with a magnet. In such an iron core structure, when the motor rotates, a torque pulsation, that is, cogging torque is generated in accordance with a permeance variation between the iron core and the magnet. The cogging torque prevents smooth rotation of the motor to make the cause impairing tranquility or controllability of the motor. Such cogging torque is apparently generated in the high $(BH)_{max}$ radial anisotropic magnet for generating a strong static magnetic field with a rectangular wave shape. Accordingly, it may be understood that an increase of the cogging torque disturbs an application in which the high $(BH)_{max}$ radial anisotropic magnet is applied to the permanent magnet motor.

As a cogging torque reducing method, there are known a method in which a magnetic pole of an iron core or a magnet is skewed or a gap between the iron core and the magnet is set to an irregular distance, a polar anisotropy method in which a magnetization direction of the magnet is set to a magnetic flux flow, a halbach method, and the like. Particularly, the halbach method of fitting segment magnets is suitable for the reduction of the cogging torque [YOSIDA, KESAMARU, SANO, "Reduction of Cogging Torque and Rotor Iron Core in terms of Segment-type Magnetization Method of Surface PM Synchronization Motor", IEEJ. Trans. IA, Vol. 124, pp. 114-115 (2004)] (see Non-patent Document 25).

However, when the magnetic pole is separated into segments, since assembling precision largely influences the cogging torque, and a limitation in an actual shape or a configuration and complexity are overlapped, its production is difficult.

For example, a perpendicular anisotropic thin-film magnet having a thickness of 0.97 mm and $(BH)_{max}=162$ kJ/m$^3$ including a self organized coupling agent is anisotropically stretched to be thereby formed into a circular arc shape having a radius of 3.55 mm, an outer radius of 3.65 mm, a maximum thickness of 0.88 mm, and a length of 10 mm. When the magnet is magnetized in a pulse magnetic field of 4 MA/m, a magnetic flux becomes 1.53 times larger than a magnetic flux amount of an isotropic $Nd_2Fe_{14}B$ bond magnet of $(BH)_{max}$ of 72 kJ/m$^3$, and thus start torque of an iron core-equipped permanent magnet motor increase 1.4 times or more [F. Yamashita, H. Fukunaga, "Radially-Anisotropic Rare-Earth Hybrid Magnet with Sel-Organizing Binder Consolidated Under a Heat and a Low-Pressure Configuration", Proc. 18$^{th}$ Int. Workshop on High Performance Magnets and Their Applications, Annecy, France, pp. 76-83 (2004)].

However, when a thickness of the magnet is, for example, 1.5 mm, since it is difficult to anisotropically stretch the perpendicular anisotropic thin-film magnet, there is a limitation in the thickness of the magnet in a deformation in which the magnetic characteristic is maintained. In a structure in which electromagnetic winding wires are arranged on a surface of the iron core opposed to the magnet, the iron core is provided with teeth and slots. For this reason, the cogging torque increases due to a permeance variation in accordance with a rotation of the motor. Particularly, the radial anisotropic magnet having a gap magnetic flux density distribution of a rectangular wave shape and a strong static magnetic field has the cogging torque 15 times or more that of the isotropic $Nd_2Fe_{14}B$ bond magnet.

As described above, as the cogging torque reducing means, many studies and ideas have been made. Particularly, the halbach method of fitting the segment magnets is suitable for the reduction of the cogging torque [YOSIDA, KESAMARU, SANO, "Reduction of Cogging Torque and Rotor Iron Core in terms of Segment-type Magnetization Method of Surface PM Synchronization Motor", IEEJ. Trans. IA, Vol. 124, pp. 114-115(2004)]. However, when the magnetic pole is separated into segments, assembling precision critically influences the cogging torque. The limitation in the actual shape or the configuration and complexity are overlapped, which is difficult to be carried out in an industrial field. For this reason, in the radial anisotropic magnet, a radial anisotropic magnet manufacturing method has been demanded which is capable of being used in a combination of a known technique such as uneven thickness or skew without separating the magnetic pole and of remarkably reducing cogging torque while maintaining an output characteristic.

Non-patent Document 1: R. W. Lee, E. G. Brewer, N. A. Schaffel, "Hot-pressed Neodymium-Iron-Boron magnets" IEEE Trans. Magn., Vol. 21, 1958(1985)

Non-patent Document 2: T. Shimoda, "Compression molding magnet made from rapid-quenched powder", "PERMANENT MAGNETS 1988 UPDATE", Wheeler Associate INC(1988)

Non-patent Document 3: W. Baran, "Case histories of NdFeB in the European community", The European Business and Technical Outlook for NdFeB Magnets, Nov. (1989)

Non-patent Document 4: G. X. Huang, W. M. Gao, S. F. Yu, "Application of melt-spun Nd-Fe-B bonded magnet to the micro-motor", Proc. of the 11$^{th}$ International Rare-Earth Magnets and Their Applications, Pittsburgh, USA, pp. 583-595(1990)

Non-patent Document 5: Kasai, "MQ1, 2&3 magnets applied to motors and actuators", Polymer Bonded Magnets' 92, Embassy Suite O'Hare-Rosemont, Ill., USA, (1992)

Non-patent Document 6: YASUHIKO IRIYAMA, "Development Tendency of High-performance Rare-earth Bond Magnet", Ministry of Education, Culture, Sports, Science and Technology, Innovation Creation Project/Symposium of Efficient Usage of Rare-earth Resource and Advanced Material, Tokyo, pp. 19-26(2002)

Non-patent Document 7: B. H. Rabin, B. M. Ma, "Recent developments in Nd—Fe—B powder", 120$^{th}$ Topical Symposium of the Magnetic Society of Japan, pp. 23-28 (2001)

Non-patent Document 8: B M. Ma, "Recent powder development at magnequench", Polymer Bonded Magnets 2002, Chicago (2002)

Non-patent Document 9: S. Hirasawa, H. Kanekiyo, T. Miyoshi, K. Murakami, Y. Shigemoto, T. Nishiuchi, "Structure and magnetic properties of $Nd_2Fe_{14}B/Fe_xB$-type nano composite permanent magnets prepared by strip casting", 9$^{th}$ Joint MMM/INTERMAG, CA (2004) FG-05

Non-patent Document 10: H. A. Davies, J. I. Betancourt, C. L. Harland, "Nanophase Pr and Nd/Pr based rare-earth-iron-boron alloys", Proc. Of 16$^{th}$ Int. Workshop on Rare-Earth Magnets and Their Applications, Sendai, pp. 485-495(2000)

Non-patent Document 11: FUMITOSHI YAMASITA, "Application and Anticipation of Rare-earth Magnet to Electronic Device", Ministry of Education, Culture, Sports, Science and Technology, Innovation Creation Project/Symposium of Efficient Usage of Rare-earth Resource and Advanced Material, Tokyo, (2002)

Non-patent Document 12: GARY TOKUNAGA, "Magnetic Characteristic of Rare-earth Bond Magnet", Fine Particle and Powder metallurgy, Vol. 35, pp. 3-7, (1988)

Non-patent Document 13: H. Sakamoto, M. Fujikura and T. Mukai, "Fully-dense Nd—Fe—B magnets prepared from hot-rolled anisotropic powders", Proc. 11$^{th}$ Int. Workshop on Rare-earth Magnets and Their Applications, Pittsburg, pp. 72-84 (1990)

Non-patent Document 14: M. Doser, V. Panchanacthan, and R. K. Mishra, "Pulverizing anisotropic rapidly solidified Nd—Fe—B materials for bonded magnets", J. Appl. Phys., Vol. 70, pp. 6603-6805 (1991)

Non-patentDocument15: T. Iriyama, "Anisotropicbonded NdFeB magnets made from hot-upset powders", Polymer Bonded Magnet 2002, Chicago (2002)

Non-patent Document 16: T. Takeshita, and R. Nakayama, "Magnetic properties and micro-structure of the Nd—Fe—B magnet powders produced by hydrogen treatment" Proc. 10$^{th}$ Int. Workshop on Rare-earth Magnets and Their Applications, Kyoto, pp. 551-562 (1989)

Non-patent Document 17: K. Morimoto, R. Nakayama, K. Mori, K. Igarashi, Y. Ishii, M. Itakura, N. Kuwano, K. Oki, "$Nd_2Fe_{14}B$-based magnetic powder with high remanence produced by modified HDDR process", IEEE. Trans. Magn., Vol. 35, pp. 3253-3255(1999)

Non-patent Document 18: C. Mishima, N. Hamada, H.Mitarai, and Y. Honkura, "Development of a Co-free NdFeB anisotropic magnet produced d-HDDR processes powder", IEEE. Trans. Magn., Vol. 37, pp. 2467-2470 (2001)

Non-patent Document 19: N. Hamada, C. Mishima, H. Mitarai and Y. Honkura, "Development of anisotropic bonded magnet with 27 MGOe", IEEE. Trans. Magn., Vol. 39, pp. 2953-2956(2003)

Non-patent Document 20: JUN KAWAMOTO, KAYO SIRAISI, KAZUTOSI ISIZAKA, SINNICHI YASUDA, "15 MGOe-grade SmFeN Injection Forming Compound", Magnetics Seminar of Electric Association, (2001) MAG-01-173

Non-patent Document 21: K. Ohmori, "New era of anisotropic bonded SmFeN magnets", Polymer Bonded Magnet 2002, Chicago (2002)

Non-patent Document 22: ATSUSIMATSUOKA, TOUGO YAMAZAKI, HITOSI KAWAGUCHI, "Investigation of Increase in Performance of Blowing Brushless DC Motor", Rotating Equipment Seminar of Electric Association, (2001) RM-01-161

Non-patent Document 23: MOTOHARU SIMIZU, NOBUYUKI HIRAI, "Nd—Fe—B-based sinter-type anisotropic ring magnet", Hitachi Metals Technical Review, Vol. 6, pp. 33-36 (1990)

Non-patent Document 24: F. Yamashita, S. Tsutsumi, H. Fukunaga, "Radially Anisotropic Ring-or Arc-Shaped Rare-Earth Bonded Magnets Using Self-Organization Technique", IEEE Trans. Magn., Vol. 40, No. 4 pp. 2059-2064 (2004)

Non-patent Document 25: Yoshida, Kesamaru, Sano, "Reduction of Cogging Torque and Rotor Iron Core in terms of Segment-type Magnetization Method of Surface PM Synchronization Motor", IEEJ. Trans. IA, Vol. 124, pp. 114-115 (2004)

SUMMARY OF THE INVENTION

In the invention, there is provided a radial anisotropic magnet manufacturing method of fixing magnet powder in a net shape so as to maintain a magnetic anisotropic (C-axis as a readily magnetized axis) angle for each part of a magnet with respect to a tangential line and for performing a deformation with a flow so as to have a predetermined circular arc shape or a predetermined annular shape. Particularly, by performing a deformation with a viscous flow or an extension flow, a deformability of the magnet is improved, and thus a shape compatibility with respect to a thickness is improved. The C-axis angle with respect to a tangential direction is controlled at an arbitrary position and an arbitrary angle so as to reduce cogging torque without separating a magnetic pole into segments.

According to one preferred embodiment of the invention, there are provided the magnet powder including anisotropic $Sm_2Fe_{17}N_3$ and anisotropic $Nd_2Fe_{14}B$, a net-shape polymer, a linear polymer, and an additive appropriately used if necessary to fix them. The radial anisotropic magnet manufacturing method is carried out such that when a microstructure of a resin composite of a pre-deformation magnet includes a magnet powder stationary phase A and a flow phase B, a part of the phase B is chemically coupled to the phase A so as to fix the stationary phase A group in a net shape, and the deformation is carried out by a shear flow action and an extension flow action of the phase B.

According to one preferred embodiment of the invention, the method includes a manufacture step for manufacturing a deformed magnet including a perpendicular anisotropic part $\alpha_0$ having a magnetic anisotropic (C-axis) angle of 90 degrees with respect to a tangential line, a non-perpendicular anisotropic part $\beta_0$ having a C-axis angle in a range of 0 to 90 degrees ($\theta$) with respect to the tangential line, and a non-perpendicular anisotropic part $\beta'_0$ having a C-axis angle in a range of 90 to 180 degrees ($\theta'$) with respect to the tangential line; and a deforming step for deforming the magnet into an annular shape or a circular arc shape so as to form a radial anisotropic part $\alpha_1$ corresponding to the perpendicular anisotropic part $\alpha_0$, a curved surface $\beta_1$, corresponding to the non-perpendicular anisotropic part $\beta_0$, and a curved surface $\beta'_1$ corresponding to the non-perpendicular anisotrcpic part $\beta'_0$. Here, the C-axis angles $\theta$ of the post-deformation curved surface $\beta_1$ corresponding to the pre-deformation non-perpendicular anisotropic part $\beta_0$ and the post-deformation curved surface $\beta'_1$ corresponding to the pre-deformation non-perpendicular anisotropic part $\beta'_0$ are continuously changed. Desirably, in the post-deformation radial anisotropic part $\alpha_1$ corresponding to the pre-deformation perpendicular anisotropic part $\alpha_0$, the post-deformation curved surface $\beta_1$ corresponding to the pre-deformation non-perpendicular anisotropic part $\beta_0$, and the post-deformation curved surface $\beta'_1$ corresponding to the pre-deformation non-perpendicular anisotropic part $\beta'_0$, the C-axis angles $\theta$ and $\theta'$ with respect to the tangential line are substantially the same before and after the deformation.

According to one preferred embodiment of the invention, the magnet is a radial anisotropic magnet having a density of 5.8 $Mg/m^3$ or more and a maximum energy product $(BH)_{max}$ of 140 $KJ/m^3$ or more.

With the above-described configuration, in terms of the deformation with the viscous flow or the extension flow of the element of the resin composite, the radial anisotropic magnet is manufactured which has a density of 5.8 $Mg/m^3$ or more and a maximum energy product $(BH)_{max}$ of 140 $KJ/m^3$ or more. Accordingly, in a permanent magnet motor provided with an even number of the radial anisotropic magnets, particularly, in an iron core-equipped permanent magnet motor, it is possible to realize a decrease in size and an increase in output as well as tranquility and controllability of a permanent magnet motor mounted with an isotropic $Nd_2Fe_{14}B$ bond magnet having $(BH)_{max}$ of approximately 80 $KJ/m^3$ or so.

In the invention, there is provided the radial anisotropic magnet manufacturing method of fixing the magnet powder in a net shape so as to maintain the C-axis angle with respect to the tangential line and for performing the deformation with the flow so as to have the predetermined circular arc shape or the predetermined annular shape. It is possible to improve the shape compatibility of the magnet by improving the deformability with the extension flow or the viscous flow of the linear polymer. When a density of the magnet according to the invention is 5.8 $Mg/m^3$ or more and a maximum energy product $(BH)_{max}$ thereof is 140 $KJ/m^3$ or more, it is possible to further realize a decrease in size and an increase in output of the general motor applied with the isotropic $Nd_2Fe_{14}B$ bond magnet having a density of 6 $Mg/m^3$ and a maximum energy product $(BH)_{max}$ of approximately 80 $KJ/m^3$ or more.

Meanwhile, regarding a bad influence with respect to tranquility and controllability of the radial anisotropic magnet motor, it is possible to control the C-axis angle with respect to the tangential direction at an arbitrary position and an arbitrary angle without separating the magnetic pole into segments.

BRIEF DESCRIPTION OF THE DRAWINGS

FIG. 7A is a characteristic diagram showing a conceptual diagram for measuring a C-axis angle with respect to a tangential direction.

FIG. 7B is a characteristic diagram showing the conceptual diagram for measuring the C-axis angle with respect to the tangential direction.

DETAILED DESCRIPTION OF THE INVENTION

A radial anisotropic magnet manufacturing method according to the invention is carried out in such a manner that magnet powders are fixed in a net shape so as to maintain a magnetic anisotropic (C-axis) angle of each part of the magnet with respect to a tangential line that is tangent to an outside border of the magnet (as illustrated in FIGS. 3B, 3D, 7A and 7B) and is deformed into an annular shape or a circular arc shape with a flow.

First, a deformation mechanism upon manufacturing a radial anisotropic magnet according to the invention will be described with reference to the drawings.

In this invention, anisotropic $Sm_2Fe_{17}N_3$, anisotropic $Nd_2Fe_{14}B$, resin composite, and additive appropriately added if necessary are constituents. By using a melt state with a slide, a pre-deformation magnet is manufactured in terms of a compressing in a range of 20 to 50 MPa in a magnetic field.

Figure 1:
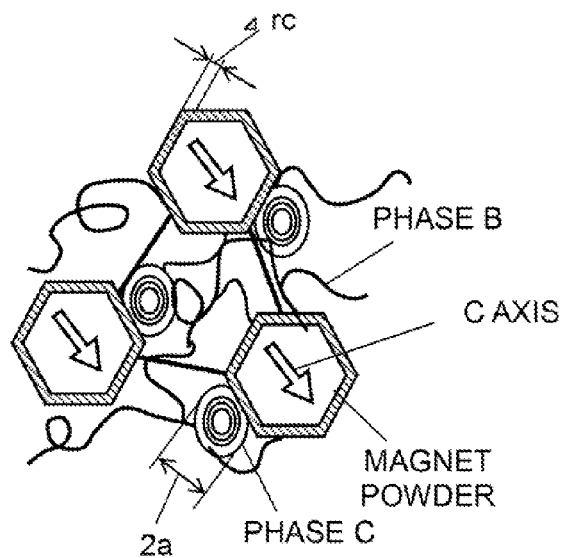
FIG. 1 is a conceptual view showing a microstructure of magnet powder and resin composite.

The pre-deformation magnet mentioned in this invention will be described with reference an exemplary conceptual diagram shown in FIG. 1. As shown in FIG. 1, the pre-deformation magnet adopts a microstructure of magnet powder and resin composite. That is, a magnet powder stationary phase A in a quasi-glass state, a linear polymer flow phase B containing a cross-linking macromolecule, and a chemical contact phase C appropriately used if necessary are included.

In FIG. 1, the phase A in a quasi-glass state is a magnet powder stationary component, and is formed by, for example, a cross-linking reaction of oligomer coated on a magnet power surface. For example, an example of the phase A includes a reaction product between novolac-type epoxy having an epoxy equivalent in a range of 205 to 220 g/eq and a melting point in a range of 70 to 76° C. and the chemical contact phase C, for example, an imidazole derivative.

Meanwhile, apart of the phase B is, for example, a linear polymer forming a cross-linking macromolecule in terms of a reaction with the phase A, and an example thereof includes polyamide having a melting point of 80° C. and a molecular mass in a range of 4,000 to 12,000 in a case where the phase A is novolac-type epoxy oligomer. Accordingly, in terms of a reaction of amino active hydrogen (—NHCOO—) in a polyamide molecular chain and an oligomer epoxy group, a group of the phase A fixing the magnet powders in a net shape can be connected in a three-dimension net shape. A remainder of the phase B, that is, the linear polymer not reacted with the phase A is heated up to a melt point or more to thereby become the phase B having a flow of a polymer melt characteristic.

A thickness $\Delta rc$ of the phase A shown in FIG. 1 is, for example, in a range of 0.1 to 0.3 μm and the chemical contact phase C is formed by a fine powder having a diameter $2a$ in a range of 2 to 3 μm, thereby being optimized in a minimum state and desirably improving a volume fraction of the magnet powder. Here, $\Delta$ indicates a variation amount.

Instead of the microstructure shown in FIG. 1 in which the phases C are distributed, a structure without the phase C may be used in such a manner that a radical initiator and a cross-linking agent reacted with prepolymer or oligomer of the phase A to thereby form a quasi-glass state are completely dissolved in the prepolymer or the oligomer of the phase A.

In this invention, the magnet having such a microstructure is manufactured, and is formed into the radial anisotropic magnet with a circular arc shape or an annular shape in terms of a deformation with a flow of the phase B shown in FIG. 1. At this time, the C axis of the magnet powder fixed by the phase A is fixed in a predetermined direction while being connected to the phase B in terms of a net-shape structure, and is completely deformed in terms of a flow of the phase B while maintaining such a state.

Next, a shear flow and an extension flow of a linear polymer melt of the phase B involved with a deformation mechanism according to the invention will be described with reference to the drawings.

Figure 2A:
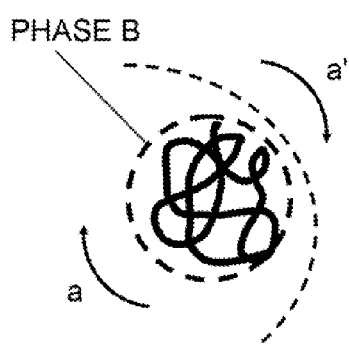
FIG. 2A is a conceptual diagram showing a shear flow and an extension flow of a linear polymer melt.

The microstructure of the magnet before and after the deformation according to the invention shown in FIG. 1 is heated up to a temperature at which the phase B flows upon being applied with an external force. The phase B flows due to shear forces a and a' upon being applied with an external force in a state where long molecules are twisted as shown in FIG. 2A. At this time, the shear force is based on two factors of a resistance generated by an entangling of molecular chains and a friction of molecules of the phase B, but may be optimized by a temperature or an external force.

A flow field called an extension flow is generated in the phase B. This means that the molecular shape of the linear polymer of the phase B is changed as shown in FIG. 2C in the deformation process due to the flow, and is a flow type generated by a deformation with a local stretching or a deformation in an area restricted by the phase A.

Figure 2B:
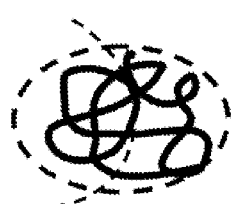
FIG. 2B is a conceptual diagram showing the shear flow and the extension flow of the linear polymer melt.
Figure 2C:
FIG. 2C is a conceptual diagram showing the shear flow and the extension flow of the linear polymer melt.

As a flow type in a deformation according to the invention, a deformation may be carried out in terms of a flow type in which a shear flow overlaps with an extension flow as shown in FIG. 2B.

A magnet, manufactured by the deformation with the flow of the phase B as described above so as to have a circular arc shape or an annular shape in which a plurality of them are connected to each other, is subjected to a heat treatment so that a cross-linking reaction progresses and the fluidity of the phase B disappears. In terms of such a process, it is possible to improve an environmental resistance such as a mechanical strength and a heat resistance.

Next, a concept for controlling magnetic anisotropic (C-axis) angles $\theta$ and $\theta'$ with respect to a tangential line of the radial anisotropic magnet according to the invention will be described with reference to the drawings.

The angle $\theta$ and the angle $\theta'$ respectively indicate the C-axis angle of non-perpendicular anisotropic parts in a range of 0 to 90 degrees and in a range of 90 to 180 degrees. The C-axis angle with respect to a tangential line of the magnet (i.e., a line that is tangent to an outside border of the magnet, as illustrated, for example, in FIGS. 3B, 3D, 7A and 7B) is denoted by $\theta_0$ and $\theta'_0$ by adding a subscript 0 thereto before the deformation of the magnet, and is denoted by $\theta_1$ and $\theta'_1$ by adding a subscript 1 thereto after the deformation of the magnet.

FIGS. 3A, 3B, 3C, and 3D are sectional diagrams showing the magnet before and after the deformation. In the drawings, $\alpha_0$ denotes a perpendicular anisotropic part having a magnetic anisotropic (C-axis) angle of 90 degrees with respect to the tangential line, $\beta_0$ denotes a non-perpendicular anisotropic part having a C-axis angle of an arbitrary angle $\theta_0$ in a range of 0 to 90 degrees, $\beta'_0$ denotes a non-perpendicular anisotropic part having an arbitrary angle $\theta'_0$ in a range of 90 to 180 degrees, and H denotes an oriented magnetic field direction.

Figure 3A:
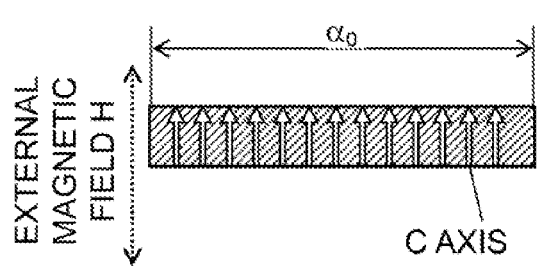
FIG. 3A is a sectional diagram showing a magnet before deformation.
Figure 3B:
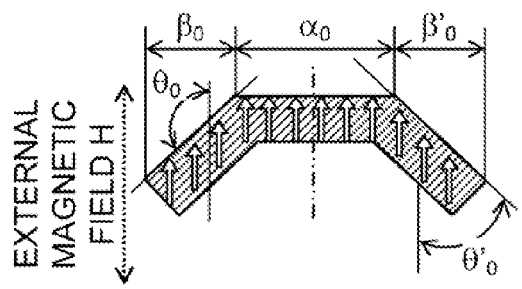
FIG. 3B is a sectional diagram showing the magnet before the deformation.
Figure 3C:
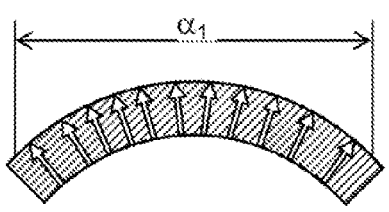
FIG. 3C is a sectional diagram showing the magnet after the deformation.
Figure 3D:
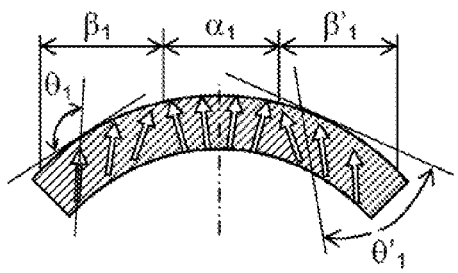
FIG. 3D is a sectional diagram showing the magnet after the deformation.

In this invention, the magnet having a configuration shown in FIG. 3A or 3B is manufactured, and the magnet is deformed into an annular shape or a circular arc shape shown in FIGS. 3C and 3D to thereby obtain a radial anisotropic part $\alpha_1$ corresponding to a perpendicular anisotropic part $\alpha_0$, a curved surface $\beta_1$ corresponding to a non-perpendicular anisotropic part $\beta_0$, and a curved surface $\beta'_1$ corresponding to a non-perpendicular anisotropic part $\beta'_0$. In this invention, the C axis of the magnetic powder fixed by the phase A is fixed in a predetermined direction in terms of the net-shape structure with the phase B. Then, the deformation progresses in terms of the flow of the phase B while maintaining such a state. As a result, it is possible to maintain the C axis of the radial anisotropic magnet with respect to the tangential line at 90 degrees and to arbitrarily maintain or to continuously control the C-axis angles $\theta_1$ and $\theta'_1$.

Particularly, in order to improve controllability or tranquility during an operation of a motor by reducing cogging torque accompanied by a rotation, the C-axis angles $\theta_1$ and $\theta'_1$ with respect to the tangential lines of a post-deformation curved surface $\beta_1$ corresponding to a pre-deformation non-perpendicular anisotropic part $\beta_0$ and a post-deformation curved surface $\beta'_1$ corresponding to a pre-deformation non-perpendicular anisotropic part $\beta'_0$ are continuously changed. In order for a characteristic stabilization, in a post-deformation radial anisotropic part $\alpha_1$ corresponding to a pre-deformation perpendicular anisotropic part $\alpha_0$, a post-deformation curved surface $\beta_1$ corresponding to a pre-deformation non-perpendicular anisotropic part $\beta_0$, and a post-deformation curved surface $\beta'_1$ corresponding to a pre-deformation non-perpendicular anisotropic part $\beta'_0$, it is desirable that the C-axis angles $\theta$ and $\theta'$ with respect to the tangential lines are substantially the same before and after the deformation. These can be optimized by the fluidity of the phase B, the optimization of the net-shaped structure of the magnet powder stationary phase A in terms of a part of the phase B, the external force degree, and the like.

A specific degree such as a configuration ratio of areas of a post-deformation radial anisotropic part $\alpha_1$, a post-deformation curved surface $\beta_1$ corresponding to a pre-deformation non-perpendicular anisotropic part $\beta_0$, and a post-deformation curved surface $\beta'_1$ corresponding to a pre-deformation non-perpendicular anisotropic part $\beta'_0$ and a level or a continuous change of the C-axis angles $\theta$ and $\theta'$ with respect to the tangential lines depends on a spirit upon designing a permanent magnet motor applied with the radial anisotropic magnet according to the invention. For example, in terms of a field of the radial anisotropic magnet according to the invention, since a permeance variation accompanied by a rotation does not occur in a motor combined with a coreless armature, cogging torque is not generated. Accordingly, in this case, the areas of $\beta_1$ or $\beta'_1$ are not necessary.

Regarding the magnet with a circular arc shape or an annular shape in which a plurality of them is connected as shown in FIGS. 3C and 3D, for example, Japanese Patent Unexamined Publication No. 2003-347142 discloses a sintering/baking radial anisotropic magnet manufacturing method in which a circular arc-shaped preliminary compact is substantially radially oriented, is combined and compressed in a cylindrical shape, and the cylindrical compact is again sintered or baked. Japanese Patent Unexamined Publication No. 2004-96961, Japanese Patent Unexamined Publication No. 2004-140270, and the like disclose a method of manufacturing an annular radial anisotropic magnet by jointing circular arc-shaped preliminary compacts which are radially oriented. However, the deformation with the flow according to the invention is not carried out. The C-axis angles $\theta$ and $\theta'$ with respect to a tangential direction according to the invention are not controlled at an arbitrary position without separating the magnetic poles.

Next, anisotropic $Sm_2Fe_{17}N_3$ and anisotropic $Nd_2Fe_{14}B$ as the magnet powders according to the invention will be described.

The anisotropic $Sm_2Fe_{17}N_3$ mentioned in this invention is obtained in such a manner that R—Fe-based alloy or R—(Fe, Co)-based alloy is manufactured in terms of a melt casting method disclosed in Japanese Patent Unexamined Publication No. H02-57663 and a reduction diffusion method disclosed in Japanese Patent No. 17025441 and Japanese Patent Unexamined Publication No. H09-157803, and is nitrified and finely-milled. The fine-milling may adopt a known technique such as jet milling, vibration ball milling, and rotation ball milling, and the fine-milling is carried out so that an average particle diameter of a fisher is 1.5 μm or less and desirably 1.2 μm or less. In order to improve a handling property such as ignition prevention, as disclosed, for example, in Japanese Patent Unexamined Publication No. S52-54998, Japanese Patent Unexamined Publication No. S59-170201, Japanese Patent Unexamined Publication No. S60-128202, Japanese Patent Unexamined Publication No. H03-211203, Japanese Patent Unexamined Publication No. S46-7153, Japanese Patent Unexamined Publication No. S56-55503, Japanese Patent Unexamined Publication No. S61-154112, and Japanese Patent Unexamined Publication No. H03-126801, fine powder is desirable in which oxide coating is slowly formed in a surface by wet or dry processing. Additionally, $Sm_2Fe_{17}N_3$ fine powder may be obtained by being subjected to one type or more surface processes of a metal coating forming method disclosed in Japanese Patent Unexamined Publication No. H05-230501, Japanese Patent Unexamined Publication No. H05-234729, Japanese Patent Unexamined Publication No. H08-143913, Japanese Patent Unexamined Publication No. H07-268632 or Lecture Summary of Japan Institute of Metals (Spring Contest, 1996, No. 446, p.184) and an inorganic coating forming method disclosed in Japanese Patent examined Publication No. H06-17015, Japanese Patent Unexamined Publication No. H01-234502, Japanese Patent Unexamined Publication No. H04-

217024, Japanese Patent Unexamined Publication No. H05-213601, Japanese Patent Unexamined Publication No. H07-326508, Japanese Patent Unexamined Publication No. H08-153613, and Japanese Patent Unexamined Publication No. H08-183601.

Meanwhile, the anisotropic $Nd_2Fe_{14}B$ mentioned in this invention is magnet powder manufactured in terms of an HDDR process (Hydrogen Decompositicn/Recombination), that is, the HDDRprocess in which Hydrogenation (Hydrogenation, $R_2[Fe, Co]_{14}$ BHx) of rare earth-iron-based alloy ($R_2[Fe, Co]_{14} B$) occurs and Decomposition (Decomposition, $RH_2+Fe+Fe_2B$), Desorpsion (Desorpsion), and Recombination (Recombination) occurs at 650 to 1,000° C. Here, since a crystalline structure of the essential rare earth element R is a cubic structure which is the same as α—Fe when less than 10 atom%, it is not possible to obtain a high magnetic characteristic, particularly, a high coercive force HCJ, and when more than 30 atom%, an R-rich nonmagnetic phases increases, thereby reducing a saturation magnetization Js. Accordingly, R is desirably in a range of 10 to 30 atom%. Additionally, in the essential element B, when less than 2 atom%, a rhombohedron structure becomes a main phase, and thus the high coercive force HCJ cannot be obtained. When more than 28 atom%, a B-rich nonmagnetic phase increases, and thus a saturation magnetization Js reduces. Accordingly, B is desirably in a range of 2 to 28 atom%. Here, in the essential element Fe, when less than 65 atom%, a saturation magnetization Js reduces, and when more than 80 atom%, a high coercive force HCJ cannot be obtained. Accordingly, Fe is desirably in a range of 65 to 80 atom%. By exchanging a part of Fe with Co, without deteriorating a magnetic characteristic of the magnet powder, it is possible to improve a temperature coefficient of a residual magnetization Jr at an actual usage temperature in terms of an increase of a Curie temperature Tc. However, when a Fe exchange amount of Co is more than 20 atom%, the saturation magnetization Js reduces. That is, when a Co exchange amount is in a range of 5 to 15 atom%, since the residual magnetization Jr generally increases, it is desirable to obtain a high $(BH)_{max}$.

On the other hand, an existence of impurities inevitably generated during an industrial production other than R, B, and Fe may be permitted. For example, a part of B may be C of 4 mass% or less or at least one type of P, S, and Cu, and an existence of 2 mass% or less in total is a general allowable range.

At least one type of Al, Ti, V, Cr, Mn, Bi, Nb, Ta, Mo, W, Sb, Ge, Ga, Sn, Zr, Ni, Si, Zn, and Hf may be appropriately added in order to improve the coercive force HCJ of the corresponding powder and a squareness characteristic Hk/HCJ of a demagnetization curve. The rare-earth element R occupying 10 atom% to 30 atom% in composition contains at least one type of Nd, Pr, Dy, Ho, and Tb or at least one type of La, Ce, Sm, Gd, Er, Eu, Tm, Yb, Lu, and Y. In general, it is sufficient that R contains one type, but may use two types or more mixtures (misch metal, sigym, and the like) in practice. The Rmay contain impurities inevitably generated during a production in an industrial accessible range.

As described above, a compound having essential constituents of the anisotropic $Sm_2Fe_{17}N_3$, the anisotropic $Nd_2Fe_{14}B$, and the resin composite is compressed at a low pressure in a range of 20 to 50 MPa in the presence of a magnetic field. In this process, the $Nd_2Fe_{14}B$ is isolated by the $Sm_2Fe_{17}N_3$, and thus fracture or damage on the surface is restricted during a forming process of the $Nd_2Fe_{14}B$. Accordingly, Hk/HCJ (Hk is a demagnetization field corresponding to 90% of magnetization of the residual magnetization Jr) of the demagnetization curve under a high temperature becomes positive, and an initial noninvertible demagnetization rate reduces.

Since it is possible to easily realize a high density in the anisotropic magnet of $Sm_2Fe_{17}N_3$ and $Nd_2Fe_{14}B$, it is possible to obtain $(BH)_{max}$ of 140 kJ/m³ or more (for example, F. Yamashita, H. Fukunaga, "Radially-Anisotropic Rare-Earth Hybrid Magnet with Sel-Organizing Binder Consolidated Under a Heat and an ow-Pressure Configuration", Proc. 18$^{th}$ Int. Workshop on High Performance Magnets and Their Applications, Annecy, France, pp. 76-83 (2004)).

EXAMPLE 1

A manufacturing method according to the invention will be described in more detail in terms of an example. However, the invention is not limited to this example.

Radial Anisotropic Magnet having C-axis Angle of 90 Degrees with respect to Tangential Line As magnet powder, anisotropic $Sm_2Fe_{17}N_3$ having a particle diameter in a range of 3 to 5 μm and anisotropic $Nd_2Fe_{14}B$ having a particle diameter in a range of 38 to 150 μm are used. In coupling agents, novolac-type epoxy having an epoxy equivalent in a range of 205 to 220 g/eq and a melting point in a range of 70 to 76° C. is used as oligomer as a main element of the magnet powder stationary phase A. The phase B is, for example, a linear polymer forming a cross-linking macromolecule in terms of a cross-linking reaction with the phase A, and for example, polyamide is used which has a mel ing point of 80° C. and a molecular mass in a range of 4,000 to 12,000. As the chemical contact of the phase C, 2-phenyl-4,5-dihydroxymethylimidazole (or 2-methylimidazole) . As the lubricant, pentaerythritolC17triester having a melting point of 52° C. is used. One molecule includes one hydroxyl group (—OH) and three hexadecyl groups (—$(CH_2)_{16}CH_3$) of carbon number 16.

Figure 4:
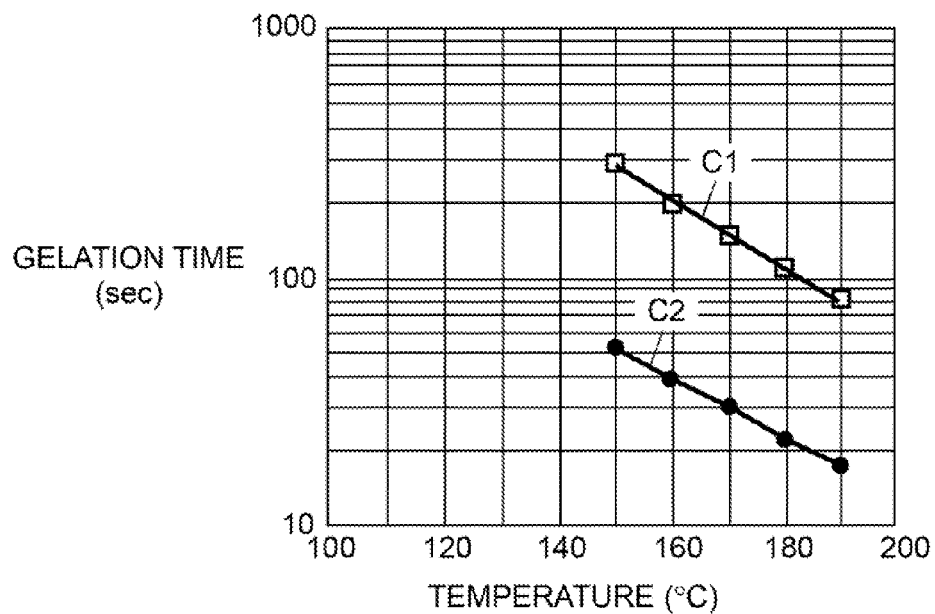
FIG. 4 is a characteristic diagram showing a relationship between a reaction temperature and a gelation time.

A compound of the coupling agents and magnet powders is obtained in such a manner that anisotropic $Sm_2Fe_{17}N_3$ of 38.20 mass% in which a surface process is carried out using oligomer of 1 mass% and anisotropic $Nd_2Fe_{14}B$ of 57.44 mass% in which a surface process is carried out using oligomer of 0.5 mass% are molten-mixed with a linear polymer of 2.80 mass% and a lubricant of 0.28 mass% at a melting point (120° C.) or more, are cooled at a room temperature, are finely milled so as to have a size of 150 μm or less, and then are dry-mixed with a chemical contact of 0.28 mass% at a room temperature. FIG. 4 is a characteristic diagram showing a relationship between a gelation time and a reaction temperature of the compound. In the drawing, C1 denotes 2-phenyl-4,5-dihydroxymethylimidazole having a gelation time of 160 sec at 170° C. and C2 denotes 2-methylimidazole having a gelation time of 30 sec at 170° C.

Subsequently, the compound is heated at 170° C. and is compressed at 20 MPa in a molten flow state with a slide in the presence of a perpendicular magnetic field of 1.4 MA/m to thereby obtain a perpendicular magnetic anisotropic magnet having a thickness 1.5 mm, 14.5 mm×15.2 mm, a density of 5.8 to 6.0 Mg/m³, and a C-axis angle of 90 degrees with respect to the tangential line. The forming time is 30 sec or so. For this reason, C1 is not in a gelation state, but C2 is in a gelation state. Accordingly, the former is the magnet according to the invention, its microstructure includes the phase A, the phase B, and the phase C shown in FIG. 1, and the latter is a magnet in an incomplete cross-linking state, but the phase B is not in a flow state even when being applied with a heat and an external force.

Upon perpendicularly performing a pulse magnetization of 4 MA/m to the magnet being in an incomplete cross-linking state according to the invention, the residual magnetization Jr is 0.93 T, the coercive force HCJ is 796 kA/m, the maximum energy product $(BH)_{max}$ is 145 kJ/m$^3$.

By applying a heat of 150 to 160° C. and an external force of 10 MPa or less to the magnet having a thickness 1.5 mm, 14.5 mm×15.2 mm, a density of 5.8 to 6.0 Mg/m$^3$, and a C-axis angle of 90 degrees with respect to the tangential line, a circular arc-shape radial anisotropic magnet is obtained which has an outer radius of 20.45 mm, an inner radius of 18.95 mm (a thickness of 1.5 mm), and an angle of 45 degrees. The magnet is attached to an outer peripheral surface of a laminated electromagnetic steel plate having an outer diameter of 37.9 mm so as to have an annular shape and 8-pole magnetization is applied to the outer periphery. This annular radial anisotropic magnet is referred to as the present inventive example 1.

Meanwhile, an isotropic $Nd_2Fe_{14}B$ bond magnet having an outer radius of 20.45 mm, an inner radius of 18.95 mm (a thickness of 1.5 mm), a density of 6 Mg/m$^3$, and $(BH)_{max}$ of approximately 80 kJ/m$^3$ or so is attached to a laminated electromagnetic steel plate, and 8-pole magnetization is applied to the outer periphery. This annular isometric $Nd_2Fe_{14}B$ bond magnet is referred to as the comparative example.

Figure 5:
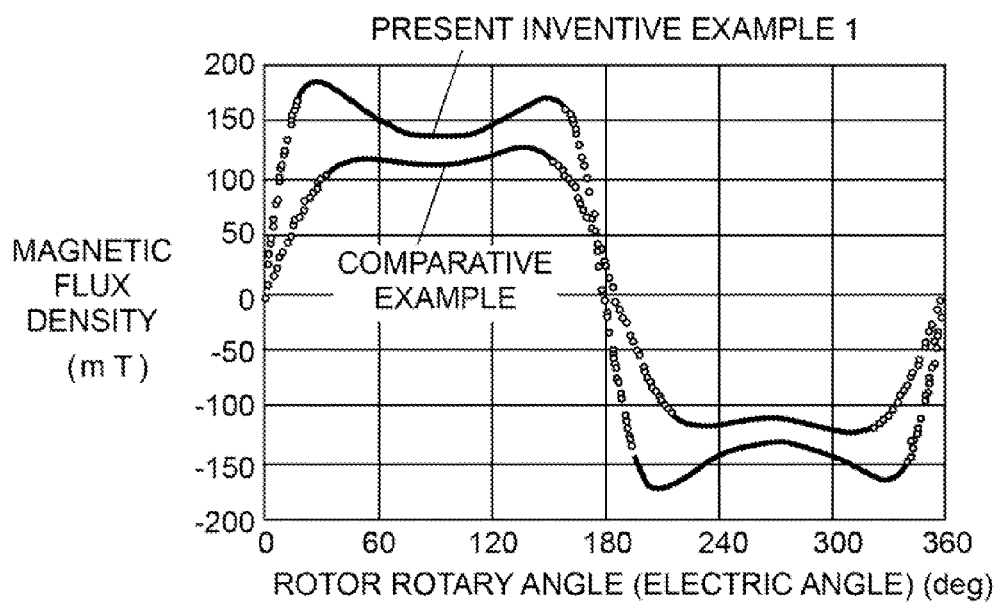
FIG. 5 is a characteristic diagram showing a surface magnetic flux density distribution in a radial direction.

FIG. 5 shows two types of surface magnetic flux density distributions in a radial direction. The present inventive example shown in the drawing has a characteristic surface magnetic flux density distribution with a rectangular wave shape of the radial anisotropic magnet, but its peak value is 185 mT, which is 1.53 times that of the comparative example.

Radial Anisotropic Magnet having C-Axis Angles θ and θ'

Figure 6:
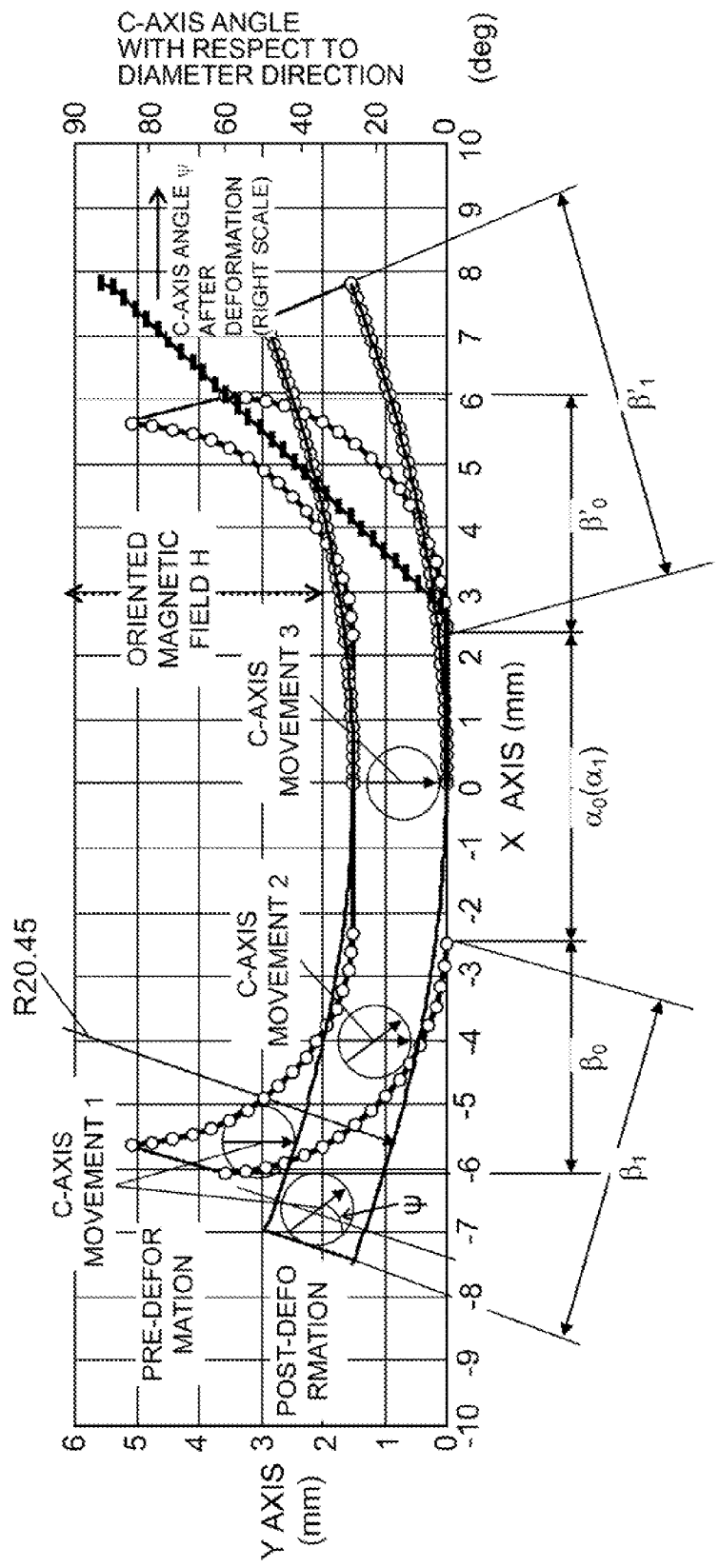
FIG. 6 is a sectional diagram showing a deformed magnet of which a C-axis direction is controlled.

The same compound in the example of the previous clause is compressed at 20 MPa in a molten flow state with a slide in the presence of a perpendicular magnetic field of 1.4 MA/m at 170° C. to thereby obtain a deformed magnet having a thickness of 1.5 mm and a density of 5.8 to 6.0 Mg/m$^3$ shown in FIG. 6 for a forming time of 30 sec or so. In FIG. 6, $\alpha_0$ denotes a perpendicular anisotropic part having a magnetic anisotropic (C-axis) angle of 90 degrees with respect to the tangential line, $\beta_0$ denotes a non-perpendicular anisotropic part having a C-axis angle of an arbitrary angle θ continuously changed in a range of 0 to 85 degrees with respect to the tangential line, Wo denotes a non-perpendicular anisotropic part having a C-axis angle of an arbitrary angle θ' continuously changed in a range of 90 to 175 degrees with respect to the tangential line, and H denotes an oriented magnetic field direction. A sectional shape of the magnet is denoted by xy coordinates (unit: mm), and the angles θ and θ' between the oriented magnetic field H and the tangential line (the tangential line of the coordinate) of the magnet are determined. Only in FIG. 6, for the convenience of expression, the C-axis direction is shown as an angle with respect to a diameter direction (a normal line direction) instead of a tangential direction. In order to avoid the misunderstanding, the angle is denoted by φ instead of θ.

Next, by applying a heat of 150 to 160° C. and an external force of 10 MPa or less to the pre-deformation deformed magnet shown in FIG. 6, a circular arc-shape radial anisotropic magnet is obtained which has an outer radius of 20.45 mm, an inner radius of 18.95 mm (a thickness of 1.5 mm), and an angle of 45 degrees.

Subsequently, in the pre-deformation deformed magnet shown in FIG. 6 and the radial anisotropic magnet obtained by deforming the same, C-axis movements 1, 2, and 3 shown in FIG. 6 are carried out, that is, a circle having a diameter of 1 mm or so is cut from the respective parts $\beta_0$, $\beta_1$, $\alpha_0$, and $\alpha_1$. Then, the sample having a diameter of 1 mm or so is fixed to a rectangular holder having a depth of 0.1 cm (0.8×1.0 cm). A self-magnetization of the sample generally tends to face the C axis as shown in FIG. 7A. However, when the external magnetic field H is applied as shown in FIG. 7B, torque is generated in the sample itself so that the C axis of the sample rotates in a direction of the magnetic field H. On the basis of a difference between a rotary angle of the sample and a rotary angle of a start point corresponding to a sample surface, the C-axis angle θ at the start point with respect to a tangential direction is obtained. As a result, the C-axis movements 1, 2, and 3 shown in FIG. 6, that is, the C-axis angles θ of the respective parts $\beta_0$, $\beta_1$, $\alpha_0$, and $\alpha_1$ with respect to a tangential direction are about 65 to 75 degrees, 40 to 50 degrees, and 85 to 95 degrees. Likewise, since the C-axis angles θ at all measured parts with respect to a tangential direction before and after the deformation are substantially the same, it is possible to apply an arbitrary angle and an angle change thereof to the sectional shape of the pre-deformation magnet.

As described above, the C-axis position of the magnetic pole center (C-axis movement 3 shown in FIG. 6) before and after the deformation is not changed, the C-axis position before and after the deformation is chanced as it is more away from the center. The analysis of the C-axis distribution is carried out in such a manner that on the basis of a solution for obtaining minimum full energy E of the sample from full energy E=Ku·sin2φ31 Is·H·cos (φ–φ$_0$) of a rotation magnetization, that is, (δE/δφ)=Ku·sin2φ–Is·H·sin (φ–φ$_0$)=0, φ is first determined and M—H loop is drawn on the basis of I=Is·cos (φ$_0$–φ). Then, a total oriented state is analyzed in such a manner that φ is obtained from Ku·sin2φ–Is·H·sin (φ$_0$–φ)=0, and a probability distribution of φ is applied to each coordinate value. Here, φ$_0$ denotes an angle of an external magnetic field, φ denotes a rotary angle of Is, I denotes self-magnetic moment, Ku denotes an anisotropic positive number, and E denotes full energy.

As a result, the C-axis movements 1, 2, and 3 shown in FIG. 6, that is, the isotropic distribution σ in the respective parts $\beta_0$, $\beta_1$, $\alpha_0$, and $\alpha_1$ is 14.5±2. From this, it may be regarded that only an anisotropic direction is changed without breaking an anisotropic characteristic.

Figure 8:
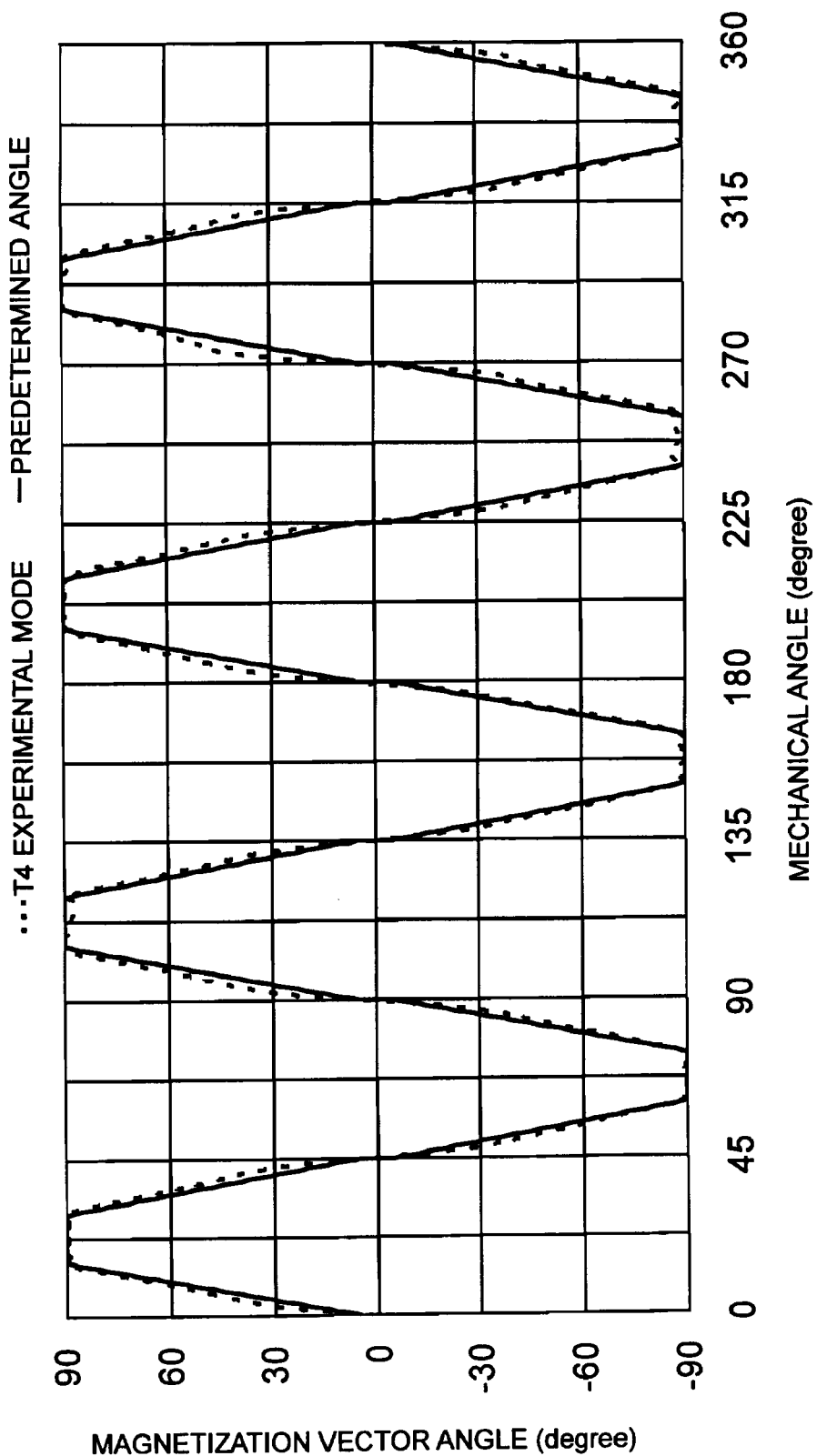
FIG. 8 is a diagram showing a magnetization vector distribution with respect to a rotor mechanical angle.

FIG. 8 is a diagram showing a magnetization vector distribution with respect to a rotor mechanical angle. The magnetization vector indicates a distribution in an anisotropic direction (C-axis angle) with respect to the tangential line.

Next, the circular arc-shape radial anisotropic magnet having an outer radius of 20.45 mm, an inner radius of 18.95 mm (a thickness of 1.5 mm), and an angle of 45 degrees is attached to an outer peripheral surface of a laminated electromagnetic steel plate having an outer diameter of 37.9 mm so as to have an annular shape, and 8-pole magnetization is applied to the outer periphery. This annular radial anisotropic magnet is referred to as the present inventive example 2.

In Table 1, an induced voltage, a distortion rate of an induced voltage waveform, and cogging torque generated when the present inventive examples 1 and 2 are combined with a stator are shown for a comparison with the comparative example.

TABLE 1

| | PRESENT INVENTIVE EXAMPLE 1 | PRESENT INVENTIVE EXAMPLE 2 | COMPARATIVE EXAMPLE |
|---|---|---|---|
| INDUCED VOLTAGE (V) (568 TURN/COIL) | 54.5 (1.36) | 53.8 (1.35) | 40 (1.0) |
| DISTORTION | 17.4 | 0.64 | 3.8 |

TABLE 1-continued

|  | PRESENT INVENTIVE EXAMPLE 1 | PRESENT INVENTIVE EXAMPLE 2 | COMPARATIVE EXAMPLE |
|---|---|---|---|
| RATE (%) | (4.70) | (0.17) | (1.0) |
| COGGING TORQUE (mNm) | 9.9 (3.0) | 1.1 (0.3) | 3.3 (1.0) |

As clearly understood from Table 1, when the radial anisotropic magnet of the present inventive example 1 is applied to a motor, it may be understood that an output can increase 1.35 times that of the comparative example on the basis of a ratio of the obtainable induced voltage of the motor applied with the isotropic $Nd_2Fe_{14}B$ bond magnet having a density of 6 $Mg/m^3$ and $(BH)_{max}$ of approximately 800 $kJ/m^3$ or so shown in the comparative example.

Regarding the cogging torque reduction problem when the radial anisotropic magnet is applied to the iron core-equipped permanent magnet motor, like the present inventive example 2, it is possible to handle the problem by using the part of the present inventive example 1 for maintaining the C-axis angle of the radial anisotropic magnet with respect to the tangential line at 90 degrees and by continuously controlling the C-axis angles θ and θ' in an arbitrary range shown in FIG. 6.

The radial anisotropic magnet according to the invention is suitable for a decrease in size and an increase in output of the permanent magnet motor.

The invention claimed is:

1. An iron core-equipped permanent magnet motor comprising an even number of radial anisotropic magnets:
wherein the radial anisotropic magnets maintain a magnetic anisotropic angle of a magnet with respect to a tangential line by fixing magnet powder in a net shape, and have a predetermined circular arc shape or a predetermined annular shape by performing a deformation with a flow;
wherein the pre-deformation magnet is a resin composite of which a microstructure includes a magnet powder stationary phase A and a flow phase B,
wherein a part of the phase B is chemically coupled to the phase A so as to fix the stationary phase A group in a net shape;
wherein the magnet is deformed by a shear flow action and an extension flow action of the phase B; wherein the radial anisotropic magnets are manufactured by
(i) manufacturing a deformed magnet including a perpendicular anisotropic part $\alpha_0$ having a magnetic anisotropic angle of 90 degree with respect to a tangential line, a non-perpendicular anisotropic part $\beta_0$ having a magnetic anisotropic angle θ in a range of 0 to 90 degree with respect to the tangential line, and a non-perpendicular anisotropic part $\beta'_0$ having θ in a range of 90 to 180 degree; and
(ii) deforming the magnet into an annular shape or a circular arc shape so as to form a radial anisotropic part $\alpha_1$ corresponding to the perpendicular anisotropic part $\alpha_0$, a curved surface $\beta_1$ corresponding to the non-perpendicular anisotropic part $\beta_0$, and a curved surface $\beta'_1$ corresponding to the non-perpendicular anisotropic part $\beta'_0$; and
wherein in the post-deformation radial anisotropic part $\alpha_1$ corresponding to the pre-deformation perpendicular anisotropic part $\alpha_0$, the post-deformation curved surface $\beta_1$ corresponding to the pre-deformation non-perpendicular anisotropic part $\beta_0$, and the post-deformation curved surface $\beta'_1$ corresponding to the pre-deformation non-perpendicular anisotropic part $\beta'_0$, the magnetic anisotropic angles with respect to the tangential line are the same before and after the deformation.

2. The iron core-equipped permanent magnet motor of claim 1,
wherein when a mechanical angle for each pole of the radial anisotropic magnets with respect to a rotation center is denoted by d°, the magnetic anisotropic angle with respect to a tangential direction is 90° in a range of an absolute value of d/6° from a magnetic pole center, and the magnetic anisotropic angle decreases at a constant rate in a direction toward an inter-magnetic-pole part in a range exceeding the absolute value of d/6° from the magnetic pole center.

3. The iron core-equipped permanent magnet motor of claim 1, wherein when a mechanical angle for each pole of the radial anisotropic magnets with respect to a rotation center is denoted by d°, the magnetic anisotropic angle with respect to a tangential direction is 90° in a range of an absolute value of d/6° from a magnetic pole center, and the magnetic anisotropic angle decreases at a constant rate in a direction toward an inter-magnetic-pole part in a range exceeding the absolute value of d/6° from the magnetic pole center.

4. The iron core-equipped permanent magnet motor of claim 2, wherein the magnetic anisotropic angle of the inter-magnetic-pole part of the radial anisotropic magnet is in a range of 0° to 10°.

5. The iron core-equipped permanent magnet motor of claim 3, wherein the magnetic anisotropic angle of the inter-magnetic-pole part of the radial anisotropic magnet is in a range of 0° to 10°.

6. An iron core-equipped permanent magnet motor of claim 1,
wherein the radial anisotropic magnets are manufactured by (i) manufacturing a deformed magnet including a perpendicular anisotropic part $\alpha_0$ having a magnetic anisotropic angle of 90 degree with respect to a tangential line, a non-perpendicular anisotropic part $\beta_0$ having a magnetic anisotropic angle θ in a range of 0 to 90 degree with respect to the tangential line, and a non-perpendicular anisotropic part $\beta'_0$ having θ in a range of 90 to 180 degree; and (ii) deforming the magnet into an annular shape or a circular arc shape so as to form a radial anisotropic part $\alpha_1$ corresponding to the perpendicular anisotropic part $\alpha_0$, a curved surface $\beta_1$ corresponding to the non-perpendicular anisotropic part $\beta_0$, and a curved surface $\beta'_1$ corresponding to the non-perpendicular anisotropic part $\beta'_0$.

7. An iron core-equipped permanent magnet motor of claim 1,
wherein the radial anisotropic magnets are manufactured by (i) manufacturing a deformed magnet including a perpendicular anisotropic part $\alpha_0$ having a magnetic anisotropic angle of 90 degree with respect to a tangential line, a non-perpendicular anisotropic part $\beta_0$ having a magnetic anisotropic angle θ in a range of 0 to 90 degree with respect to the tangential line, and a non-perpendicular anisotropic part $\beta'_0$ having θ in a range of 90 to 180 degree; and (ii) deforming the magnet into an annular shape or a circular arc shape so as to form a radial anisotropic part $\alpha_1$ corresponding to the perpendicular anisotropic part $\alpha_0$, a curved surface $\beta_1$ corresponding to the non-perpendicular anisotropic part $\beta_0$, and a curved surface $\beta'_1$ corresponding to the non-perpendicular anisotropic part $\beta'_0$ and, wherein the magnetic anisotropic angles $\theta$ of the post-deformation curved surface $\beta_1$ corresponding to the pre-deformation non-perpendicular anisotropic part $\beta_0$ and the post-deformation curved surface $\beta'_1$, corresponding to the pre-deformation non-perpendicular anisotropic part $\beta'_0$ with respect to the tangential line are continuously changed.

* * * * *

UNITED STATES PATENT AND TRADEMARK OFFICE
CERTIFICATE OF CORRECTION

| | | |
|---|---|---|
| PATENT NO. | : 8,183,732 B2 | |
| APPLICATION NO. | : 13/277355 | |
| DATED | : May 22, 2012 | |
| INVENTOR(S) | : Fumitoshi Yamashita et al. | |

It is certified that error appears in the above-identified patent and that said Letters Patent is hereby corrected as shown below:

ON THE COVER PAGE

In section (57) Abstract, line 13, "respect to a thickness is. improved. A C-axis angle Θ with" should read --respect to a thickness is improved. A C-axis angle Θ with--.

Signed and Sealed this
Twentieth Day of November, 2012

David J. Kappos
*Director of the United States Patent and Trademark Office*